United States Patent
Schönewerk

(10) Patent No.: US 9,749,776 B2
(45) Date of Patent: Aug. 29, 2017

(54) MEDICAL FOOT CONTROL APPARATUS

(71) Applicant: Aesculap AG, Tuttlingen (DE)

(72) Inventor: Erik Schönewerk, Donaueschingen (DE)

(73) Assignee: AESCULAP AG (DE)

( * ) Notice: Subject to any disclaimer, the term of this patent is extended or adjusted under 35 U.S.C. 154(b) by 0 days.

(21) Appl. No.: 14/960,715

(22) Filed: Dec. 7, 2015

(65) Prior Publication Data

US 2016/0174018 A1 Jun. 16, 2016

(30) Foreign Application Priority Data

Dec. 12, 2014 (DE) ........................ 10 2014 118 528

(51) Int. Cl.
*H04W 4/00* (2009.01)
*G08C 17/02* (2006.01)
*H04B 5/00* (2006.01)

(52) U.S. Cl.
CPC ............ *H04W 4/008* (2013.01); *G08C 17/02* (2013.01); *H04B 5/0025* (2013.01); *G08C 2201/20* (2013.01)

(58) Field of Classification Search
CPC ... H04W 4/008; H04W 76/02; H04W 76/023; H04B 5/0025; H04B 2201/71346; H04B 7/18558; G01C 17/02; G08C 2201/20
See application file for complete search history.

(56) References Cited

U.S. PATENT DOCUMENTS

| 8,654,074 | B1 * | 2/2014 | Auguste | ................ G06F 1/1632 |
| | | | | 345/156 |
| 9,035,741 | B2 * | 5/2015 | Hamel | ............. A61B 17/32002 |
| | | | | 340/3.2 |
| 2006/0255961 | A1 | 11/2006 | Hofer | |
| 2007/0249286 | A1 | 10/2007 | Ma | |
| 2008/0287062 | A1 * | 11/2008 | Claus | .................... H04W 12/02 |
| | | | | 455/41.2 |
| 2008/0312584 | A1 | 12/2008 | Montgomery | |

(Continued)

FOREIGN PATENT DOCUMENTS

CA   2912143     12/2014
DE   19501581    7/1996
(Continued)

OTHER PUBLICATIONS

DE Search Report for Application No. 10 2014 118 528.5; dated Apr. 13, 2015; including partial English translation.

(Continued)

*Primary Examiner* — Andrew Wendell
(74) *Attorney, Agent, or Firm* — Ratnerprestia

(57) ABSTRACT

A pairing method for wireless communication of an operating unit of a medical control unit with a control apparatus of the medical control unit includes the step of arranging the medical control unit to control a medical device. The operating unit includes at least two operating elements upon the respective user-side actuation of which a control signal is transmitted from a control apparatus to the medical device. The control apparatus is in a pairing mode (or is put into a pairing mode) and the operating unit is put into a pairing mode due to user-side combined actuation of at least two operating elements. A medical control unit implements the pairing method.

10 Claims, 2 Drawing Sheets

(56) References Cited

U.S. PATENT DOCUMENTS

Figure 1:
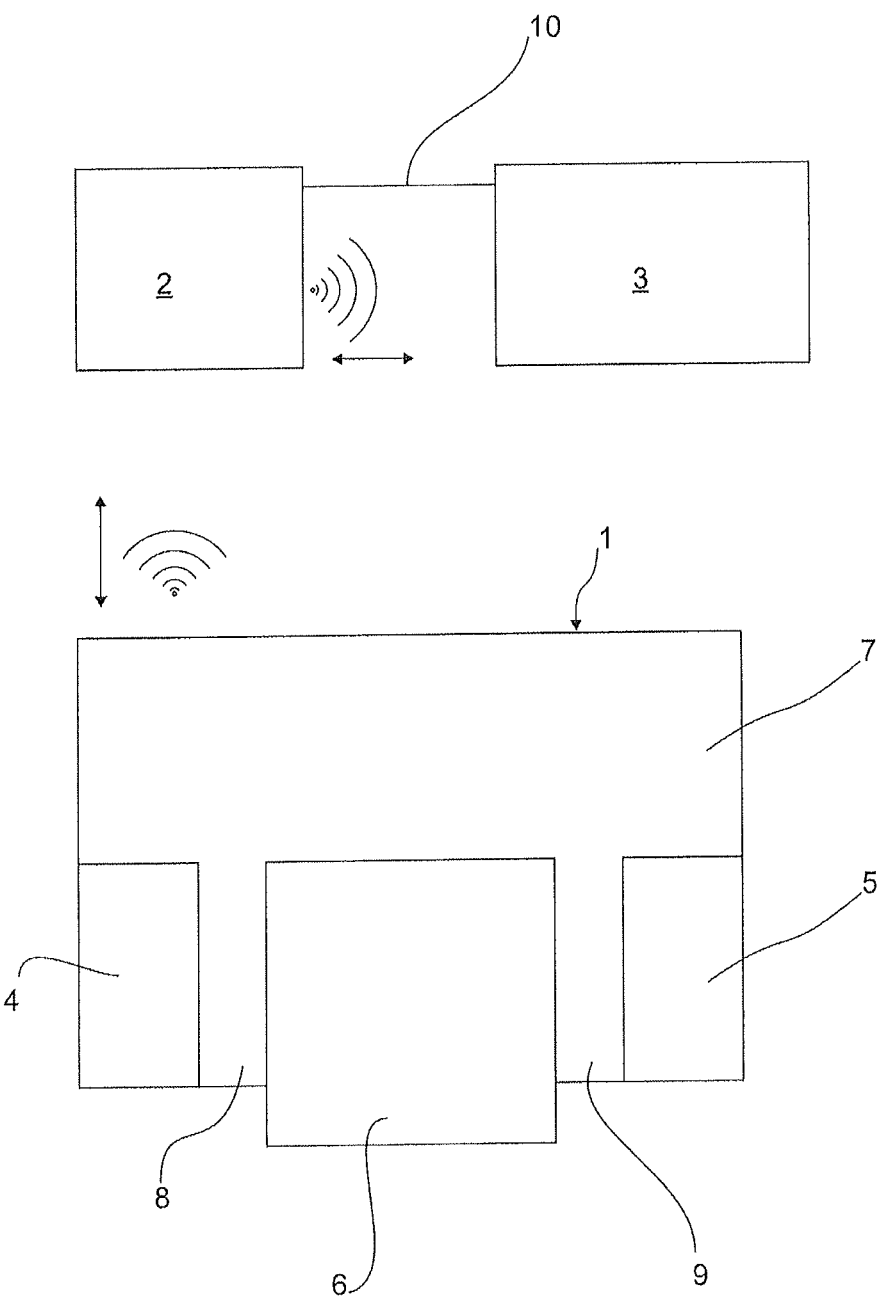

| | | | | |
|---|---|---|---|---|
| 2009/0203349 A1* | 8/2009 | Hollstien | ............ | G08B 25/016 |
| | | | | 455/404.1 |
| 2010/0160759 A1* | 6/2010 | Celentano | .......... | A61B 5/14532 |
| | | | | 600/365 |
| 2010/0190444 A1 | 7/2010 | Parhami | | |
| 2011/0013005 A1* | 1/2011 | Watkins | ............ | A61B 1/00039 |
| | | | | 348/77 |
| 2011/0098721 A1* | 4/2011 | Tran | ...................... | H01H 21/26 |
| | | | | 606/130 |
| 2011/0275025 A1* | 11/2011 | Lint | .................... | A61C 1/0015 |
| | | | | 433/27 |
| 2013/0289770 A1 | 10/2013 | Rawls-Meehan | | |
| 2017/0021184 A1* | 1/2017 | Pavel | .................. | A61N 1/3987 |

FOREIGN PATENT DOCUMENTS

| | | |
|---|---|---|
| DE | 102013105822 | 12/2014 |
| EP | 2033591 | 3/2009 |
| EP | 2209413 | 8/2011 |

OTHER PUBLICATIONS

European Search Report for EP Application No. 15199337.5, dated May 11, 2016 with translation.

* cited by examiner

MEDICAL FOOT CONTROL APPARATUS

RELATED APPLICATIONS

This application is related to and claims the benefit of priority of German Application No. DE 10 2014 118 528.5, filed Dec. 12, 2014, the content of which is incorporated by reference herein in its entirety and for all purposes.

FIELD

The present invention relates to a pairing method for wireless communication of an operating unit, especially a foot-operated switch device, of a medical control unit, especially a foot control unit, with a control apparatus of the medical control unit, wherein the operating unit and the control apparatus are in wireless communication with each other. Furthermore, it relates to a medical control unit, especially a foot control unit, including an operating unit, especially a foot-operated switch means, and a control apparatus adapted to be wirelessly communicated therewith, the operating unit having at least two operating elements upon the respective user-side actuation of which a control signal is output by the control apparatus to the medical device for control thereof.

BACKGROUND

From the state of the art medical foot control apparatuses are known in which two components or devices radio-communicating with each other such as a motor-control apparatus and a radio foot control apparatus are employed. In order to communicate said components with each other it is known to carry out a so called pairing procedure. Accordingly, a special event is used upon occurrence of which the devices are caused to change to a pairing mode. In the state of the art a separate device, for example in the form of an additional switch, is required for this purpose. The separate device is not required for the actual control during normal operation. It increases the costs and the complexity of the foot control apparatus in an adverse manner. Especially with respect to requirements in the field of medical engineering, moreover the risk of leakage at the device which is necessarily configured to be watertight is increased.

SUMMARY

Starting from the afore-described state of the art, the object underlying the invention is to provide a pairing method for a medical control unit as well as such control unit, especially a medical foot control apparatus, in which an operating unit of the medical control unit wirelessly communicates with a control apparatus of the medical control unit and the operating unit is wirelessly paired with the control apparatus, wherein no device particularly introduced for this purpose is required.

This object is achieved by a pairing method for wireless communication or correlation of an operating unit of a medical control unit with a control apparatus of the medical control unit, the medical control unit being arranged and intended for controlling a medical device, the operating unit including at least two operating elements upon or due to the respective user-side actuation of which the control apparatus outputs a control signal to the medical device, wherein the control apparatus is provided in a pairing mode or is put into said pairing mode and the operating unit is put into a pairing mode due to combined user-side actuation of at least two operating elements in that the at least two operating elements are actuated in a combination deviating for the output of a control signal from the control apparatus to the medical device. Since the operating elements for inputting instructions to control the medical device are present at the operating unit anyway, no separate operating elements are required to initiate a pairing procedure. Therefore, the operating unit may have an advantageously simple configuration. The operating unit and the control apparatus may communicate especially via NFC or Bluetooth. For this purpose e.g. the proprietary Steute-Wireless® radio communication protocol is suited.

In other words, the motor control apparatus may be provided in the pairing mode or, resp., can be put into the same via screen dialogue. Two already present operating elements which a user utilizes for controlling the medical device via the control apparatus are used to put the operating unit equally into the pairing mode. According to the invention, preferably a combination is used, i.e. the operating elements are actuated in such combination which inadvertently will be actuated only with hardly any probability and will not occur during normal operation—i.e. with the actual control of the medical device—. This could be a simultaneous actuation, for example of two operating elements, especially external switches, arranged on the outside or the border of the operating unit.

The two operating elements can be arranged to be spaced apart from each other especially so that they cannot be actuated simultaneously by one foot or can only be actuated at a foot position deviating from the usual operation.

In the pairing mode the operating unit and the control apparatus are coupled or correlated to each other. In other words, in a pairing operation a particular selected operating unit is assigned to a particular control apparatus for controlling the medical device so that wireless communication of said two particular units is possible. It can be ensured by defined coupling or correlating the operating unit to the control apparatus that exclusively the desired operating unit communicates with the desired control apparatus. It is possible to safely prevent for example a wrong operating unit or two operating units at the same time from communicating with the same control apparatus.

The correct or desired pairing of the operating unit and the control apparatus may be effected especially by assigning identification to the control apparatus and/or to the operating unit. Said identification may be contained, for example, within an NFC tag. From the user's viewpoint, a pairing operation can take place, for instance, such that after start of the control apparatus, with no wire-bound operating unit being connected, the user is requested to couple a desired operating unit to the control apparatus (in accordance with a pairing). The request may be shown on a display of the control apparatus, for example. It may especially be illustrated. In particular, the user may be requested to move the operating unit to be coupled adjacent to the control apparatus or the display thereof and to confirm the coupling, where appropriate. In this way, a testing of the operating unit can be carried out and a confirmation can be provided by the user. Due to such user-side confirmation, the operating unit can be put into the pairing mode. The control apparatus and the operating unit now are correlated. When the pairing is effected via NFC, the user-side confirmation may be omitted, as the assignment of the devices is doubtless. However, the user may also be offered the possibility of disconnecting the pairing again when the pairing result is not desired (e.g. in the case of double-key actuation). Subsequently, a functioning test of the operating unit can be carried out.

On the device level the pairing method according to the invention may be run in that, in case that no operating unit has been detected by the control apparatus, a radio module, especially an NFC module, will be or is activated. A request for action for correlation may be output to the user. The radio module may be switched on. According to the invention, an NFC tag within reach of the radio module can now be searched.

When the control apparatus detects an NFC tag, the latter can initially be read out. Identification can be searched for identifying the type of device of the operating unit. When the detected tag belongs to an appropriate or desired operating unit, the control apparatus reads out an ID of an HF module of the operating unit and can change to a writing mode so as to write its own HF module ID into the tag. After that the NFC transceiver can be switched off.

The operating unit can wake up from the standby mode or can change to an active state by the afore-described procedures. Then it can read out identification or ID stated in the tag. Moreover, it can initiate a connection establishment and establish such connection, where appropriate, for example via Steute-Wireless®. The control apparatus receives the attempt to connect of the operating unit and can especially automatically accept the same. The combined user-side actuation of at least two operating elements which takes place in the method according to the invention to put the operating unit into a pairing mode may cause the operating unit to read out identification or ID provided in the tag. When NFC is used the double actuation is not necessary as the operating unit is automatically wakened by the harvested voltage when it is moved to the vicinity of the control apparatus. Alternatively or additionally it may initiate the connection establishment and possibly establish the connection. Further alternatively or additionally, it may cause the operating unit to wake up or be activated from a non-operated state. Finally it may form a user-side confirmation of the pairing procedure which need not influence especially the afore-described communication between the operating unit and the control apparatus, but may serve for utilizing received data in the control apparatus for the internal control of the medical device.

On the electronics level, upon start-up an NFC transceiver, for example CR95HF (ST), can emit an alternating magnetic field and can attempt to address tags within reach. An NFC-EEPROM, for example M24LR04E (ST), may be built in the operating unit. It can obtain its operating energy from the alternating field emitted by the transceiver preferably by means of energy harvesting via a frame antenna. The transceiver can read out data included in the EEPROM—while entering correct passwords or identifications—and also describe a sector intended to contain the ID of the control apparatus. In this way, the respective required correlating or pairing information is now provided on both sides—on the side of the operating unit as well as on the side of the control apparatus—.

The EEPROM may emit the "harvested" supply voltage especially at a pin. Therefore a microcontroller of the operating unit can wake up or be activated by means of a hardware interrupt. The operating voltage of the EEPROM can be switched on. Connecting data from the EEPROM can be read out via $I^2C$, for example. The EEPROM supply voltage can be switched off again and the connection to the control apparatus may be established by means of Steute-Wireless®, for instance.

The operating unit may especially be a foot-operated switch means or a manual control. It communicates wirelessly with the control apparatus which in turn controls the medical device. An operating element of the operating unit preferably can be a switch or a pedal which is actuated by a user so as to control the medical device via the control apparatus by the same. The at least two operating elements can be put into the pairing mode especially by simultaneously actuating the two operating elements. In one embodiment the at least two operating elements may be spatially separated and/or spaced apart from each other. In particular, they may be spaced apart and/or spatially separated from each other so that simultaneous actuation of the two operating elements or actuation of both operating elements in the combination required for a pairing is possible only two-handed or by both feet. In this way, a deliberate user-side actuation of the operating unit is required for the pairing operation and inadvertent initiation of a pairing operation is excluded.

In one embodiment the operating unit may include three juxtaposed operating elements and may be put into a pairing mode especially due to a user-side combined actuation of the two outer operating elements. Arrangements of operating elements of this type are useful especially in the case of foot-operated switching means so that known hardware can be employed to apply the method according to the invention.

The operating elements, especially the operating elements to be actuated in combination for a pairing procedure, are structurally designed according to a suggestion of the invention so that stacking of operating means cannot result in actuating the two side switches, as this would be required for a pairing procedure.

According to a further embodiment, the operating unit can be put into the pairing mode by a combined actuation of the at least two operating elements lasting a fixed period of time, preferably 2 to 4 seconds, more preferably 3 seconds. Such period of time can be used in particular to carry out a self-test of the operating unit in order to detect possibly present defects.

On the apparatus side, the object underlying the invention is achieved by a medical control unit, especially a medical foot control unit, comprising an operating unit and a control apparatus adapted to be wirelessly communicated with the latter. The operating unit includes at least two operating elements. Upon respective user-side actuation of the latter, a control signal is transmitted by the control apparatus to the medical device for controlling the medical device. The control apparatus is arranged to be in a pairing mode or to be put into such pairing mode. The operating unit can be put into a pairing mode by combined actuation of at least two operating elements. For this purpose, the at least two operating elements have to be actuated in a combination deviating for the output of a control signal from the control apparatus to the medical device. The medical control unit according to the invention is especially suited and arranged to implement a method according to the invention, especially a method according to any one of the attached claims.

According to one embodiment, an NFC transceiver of the operating unit and/or the control apparatus may include a frame antenna through which an alternating magnetic field is emitted. A larger surface area of the frame antenna tends to allow for larger reach. In the normal case it is about 5 to 10 cm. The antenna is preferably integrated in the control apparatus. It may especially be a PCB antenna or a foil antenna or a ferrite foil. In general, the antenna has to be tuned or adapted exactly to the frequency and the transceiver IC.

The operating unit may include an NFC-EEPROM, in particular of the M24LR04E type, having an appropriate circuit. The NFC-EEPROM preferably includes at least one pull-up for an I²C bus, a FET for switching the voltage supply and/or a block type capacitor.

In one embodiment the control apparatus may include an NFC transceiver of the CR95HF type comprising an adapter network, especially comprising diverse minor SMD capacitors and resistors, and quartz.

According to one embodiment, it is provided that between the operating unit and the control apparatus contact signals are iteratively exchanged, e.g. by transmitting a ping over a particular fixed time period (e.g. 3 minutes) within fixed intervals (e.g. every 5 seconds).

In one embodiment of the invention it is provided that, if the operating unit does not reach or has not reached the control apparatus for a defined time period, pairing procedures are stopped, partner identification is cancelled or marked as invalid and the operating unit changes to a sleep mode or standby mode.

According to another embodiment, if the control apparatus is switched off, it is provided to reset an integrated "real time clock" (RTC). Said real time clock may be wired to an appropriately dimensioned buffer capacitor and thus continues running. If the control apparatus is started again, the current RTC status can be evaluated. If the latter is below a defined value (e.g. 5 minutes), the deposited partner identification of the latest correlated operating unit continues being valid and signals of said operating unit are processed by the control apparatus, in particular a transceiver of the control apparatus is adapted to respond to a signal of the operating unit. However, if the value of the RTC status is at or above a defined limit, the partner identification can be cancelled or marked to be invalid.

BRIEF DESCRIPTION OF THE DRAWING FIGURES

Figure 2:
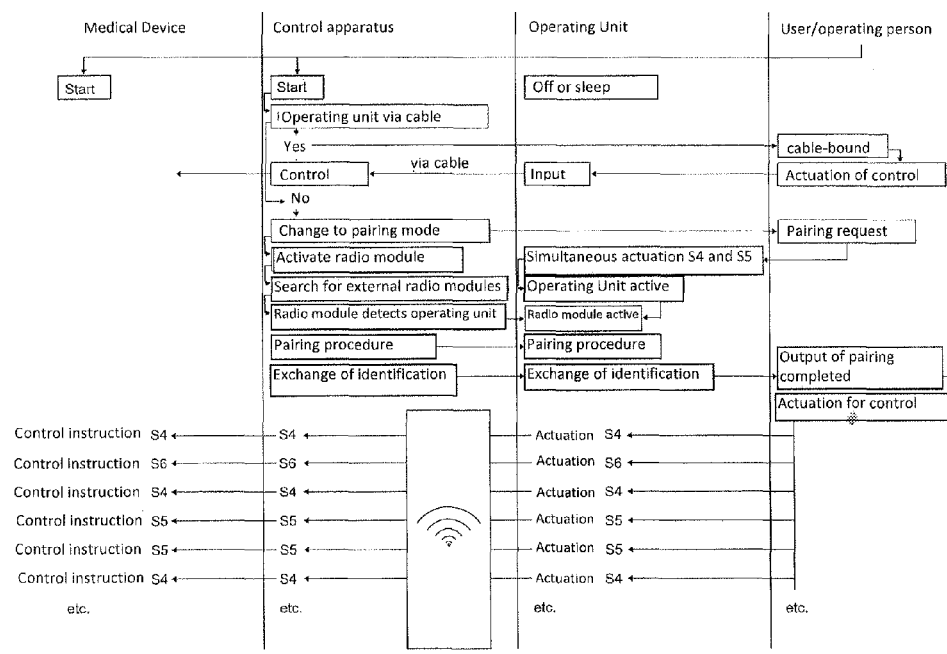

Further features and advantages of the present invention will be resulting from the following exemplary description of the invention as well as from particularly preferred and non-limiting embodiments by way of figures which merely serve for the comprehension of the invention and which show in:

FIG. 1, a schematic top view of an operating unit for implementing the method according to the invention; and in FIG. 2, a schematic of the flow of an exemplary method according to the invention.

DETAILED DESCRIPTION

In FIG. 1, a foot-operated switching unit 1 is shown as operating unit 1. It includes a housing 7 on which a first operating element 4 in the form of a border-side foot switch 4 (hereinafter also referred to as switch S4), a second operating element 5 in the form of a foot switch 5 (hereinafter also referred to as switch S5) disposed on the side of the housing 7 opposite to the foot switch 4 and a central switch 6 (hereinafter also referred to as switch S6) are arranged. Each of the foot switch 4, the foot switch 5 and the central switch 6 is an operating element actuated by a user to control a medical device 3 controlled by the foot-operated switching unit 1 for the medical application of the medical device.

As indicated in the Figure, the foot-operated switching unit 1 is in wireless communication with a control apparatus 2. The latter controls the medical device 3 wirelessly and/or via an appropriate circuit 10.

A land 8, 9 is arranged between each of the foot switch 3 and the central switch 6 as well as between the foot switch 5 and the central switch 6. The land causes an interstice or space to be provided between said switches 4, 5, 6 so that inadvertent or unintended actuation of the wrong switch can be avoided.

Vis-à-vis the central switch 6 the foot switches 4, 5 are arranged or formed to be recessed in the direction of the housing 7. Due to this configuration the two border-side foot switches 4, 5 cannot be actuated in combination with each other or even simultaneously by one foot only. A combined and/or simultaneous actuation of the border-side foot switches 4, 5 thus is possible only by deliberate actuation by both feet of the user. This ensures that such actuation which according to the invention results in a pairing of the operating unit 1 with the control unit 2 indicated in the Figure cannot be inadvertently started.

FIG. 2 schematically illustrates an exemplary flow of the method. The method starts in that a user or an operating person starts the medical device 3 and the control apparatus 2. The operating unit 1 is switched off and/or is in idle mode (sleep mode) at this point in time.

After the start the control apparatus 2 checks whether an operating unit 1 is cable-connected. When such cable-connected operating unit 1 is detected, appropriate information is output to the user and the medical device 3 is controlled via the control apparatus 2 by a user-side input of control instructions into the cable-connected operating unit 1.

Unless a cable-connected operating unit 1 is detected, the control apparatus 2 changes to the pairing mode. Alternatively, the control apparatus 2 may directly change or be put into the pairing mode. In the latter a radio module of the control apparatus 2 is activated and a request for initiating a pairing procedure is output to the user. In the shown example, the pairing procedure is initiated by the user actuating the switches S4 and S5 of the operating unit 1 simultaneously for a particular time period, e.g. for three seconds.

Due to such user-side actuation initiating the pairing procedure, the operating unit 1 and the radio module thereof are activated. Meanwhile the control apparatus 2 searches for external radio modules of operating devices 1 provided in the vicinity by means of its radio module. The control apparatus 2 detects the operating unit 1 whereupon the pairing is carried out, e.g. inter alia by exchanging identifications or passwords. After accomplished pairing information that the pairing has been successfully completed is output to the user.

Then the user can control the medical device 3 by actuating the switches S4, S5, S6 of the operating unit 1 via the control apparatus 2. Upon actuation of the switch S4 the control apparatus 2 outputs an appropriate instruction to the medical device 3. This applies mutatis mutandis when the switches S5 or S6 are actuated. The actuations of the switches of the operating unit 1 required for the control of the medical device 3 are different from the simultaneous actuation of the switches S4 and S5 required for initiating the pairing.

The control of the medical device 3 via the operating unit 1 radio-communicated with the control apparatus 2 is possible until the latter are uncoupled by the user or the operating unit 1 and/or the control apparatus 2 is/are switched off or not used for a predetermined period of time.

The invention claimed is:
1. A pairing method for wireless communication with a control apparatus of a medical device, the pairing method comprising the steps of:

providing an operating unit arranged and intended for controlling the medical device, the operating unit including at least two operating elements;

activating a radio module on the control apparatus of the medical device to place the control apparatus in a pairing mode in which the control apparatus searches for an external radio module;

actuating the at least two operating elements of the operating unit in a combined actuation to activate a radio module on the operating unit;

detecting the activated radio module on the operating unit via the radio module of the control apparatus to initiate a pairing procedure between the control apparatus and the operating unit; and pairing the control apparatus and the operating unit, upon completion of which the medical device is controlled by user-side actuation of the at least two operating elements to output instructions to the medical device, wherein said user-side actuation of the at least two operating elements to output instructions to the medical device is different from said combined actuation of the at least two operating elements to activate the radio module on the operating unit.

2. The pairing method according to claim 1, wherein the step of actuating the at least two operating elements of the operating unit in a combined actuation to activate a radio module on the operating unit comprises simultaneous actuation of the at least two operating elements.

3. The pairing method according to claim 1, wherein the step of actuating the at least two operating elements of the operating unit in a combined actuation to activate a radio module on the operating unit comprises a combined actuation of the at least two operating elements lasting a fixed period of time.

4. The pairing method according to claim 1, wherein the at least two operating elements are spatially separated from each other.

5. The pairing method according to claim 1, wherein the at least two operating elements are spaced apart and/or spatially separated from each other in such a manner that simultaneous actuation of the two operating elements is possible only two-handed or by both feet.

6. The pairing method according to claim 1, wherein the operating unit is a foot-operated switch.

7. The pairing method according to claim 1, wherein the at least two operating elements comprises three operating elements arranged side by side so as to define two outer operating elements and one central operating element, and wherein the radio module of the operating unit is activated by a user-side combined actuation of the two outer operating elements.

8. The pairing method according to claim 1, wherein the operating unit and the control apparatus communicate via NFC or Bluetooth.

9. A medical control unit comprising an operating unit and a control apparatus adapted to be wirelessly connectable for communication with the operating unit, the operating unit comprising at least two operating elements and a first radio module, the control apparatus comprising a second radio module that is activatable to place the control apparatus in a pairing mode in which the control apparatus searches for an external radio module, the at least two operating elements of the operating unit being actuatable in a combined actuation to activate the first radio module of the operating unit, upon which said first radio module of the operating unit is detectable by the second radio module of the control apparatus when the control apparatus is in a pairing mode to initiate a pairing procedure, wherein, upon completion of the pairing procedure, the at least two operating elements of the control apparatus are actuatable by a user-side actuation to output instructions to the control unit to control a medical device, said user-side actuation of the at least two operating elements to output instructions being different from said combined actuation to activate the first radio module of the operating unit.

10. The medical control unit according to claim 9, which is adapted and arranged to implement a method according to claim 1.

* * * * *